(12) United States Patent
Bergmans et al.

(10) Patent No.: US 7,110,448 B2
(45) Date of Patent: Sep. 19, 2006

(54) ZF-BASED ADAPTIVE ASYNCHRONOUS RECEIVER

(75) Inventors: Johannes Wilhelmus Maria Bergmans, Eindhoven (NL); Charalampos Pozidis, Gattikon (CH); Jianjiang Wang, Fremont, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 725 days.

(21) Appl. No.: 10/281,784

(22) Filed: Oct. 28, 2002

(65) Prior Publication Data

US 2003/0095592 A1 May 22, 2003

(30) Foreign Application Priority Data

Oct. 31, 2001 (EP) ................................. 01402835

(51) Int. Cl.
*H03H 7/30* (2006.01)
*H04L 27/06* (2006.01)
(52) U.S. Cl. ........................................ 375/233; 375/316
(58) Field of Classification Search ................ 375/377, 375/322, 229, 230, 232, 233, 316; 708/323, 708/313, 300, 322; 333/18, 28 R
See application file for complete search history.

(56) References Cited

U.S. PATENT DOCUMENTS

| | | | | |
|---|---|---|---|---|
| 5,018,166 A | * | 5/1991 | Tjahjadi et al. | 375/232 |
| 5,878,088 A | * | 3/1999 | Knutson et al. | 375/324 |
| 5,966,415 A | * | 10/1999 | Bliss et al. | 375/350 |
| 5,999,355 A | * | 12/1999 | Behrens et al. | 360/65 |
| 6,295,325 B1 | * | 9/2001 | Farrow et al. | 375/327 |
| 6,836,511 B1 | * | 12/2004 | Marukawa | 375/232 |
| 6,975,689 B1 | * | 12/2005 | McDonald et al. | 375/316 |
| 2002/0037058 A1 | * | 3/2002 | Birru | 375/340 |
| 2002/0130798 A1 | * | 9/2002 | Tonami | 341/118 |
| 2003/0043651 A1 | * | 3/2003 | Kojima et al. | 365/200 |

* cited by examiner

*Primary Examiner*—Tesfaldet Bocure
(74) *Attorney, Agent, or Firm*—Michael E. Belk (57) ABSTRACT

The invention concerns an asynchronous receiver for digital transmission and recording systems. The receiver comprises a sampling rate converter (SRC) for timing recovery, preceded by a digital adaptive equalizer operating at the sampling rate $1/T_s$, asynchronous to the data rate $1/T$. An equalizer adaptation method using zero-forcing (ZF) techniques is described for adapting equalizer taps asynchronously to the data rate via a control loop. To this end, the control loop comprises temporal interpolation means performing time-base conversion for converting signals from the synchronous domain $(1/T)$ to the asynchronous domain $(1/T_s)$ and spatial conversion means to convert T-spaced signals into $T_s$-spaced signals.

19 Claims, 3 Drawing Sheets

ZF-BASED ADAPTIVE ASYNCHRONOUS RECEIVER

FIELD OF THE INVENTION

The invention relates to a receiver for delivering a data sequence at a data rate 1/T from a received sequence sampled at a clock rate 1/Ts, asynchronous to the data rate 1/T, the receiver comprising:
- an adaptive equalizer for delivering an equalized sequence from said received sequence, said equalizer operating at the clock rate 1/Ts and having an equalizer coefficient vector controlled by a control vector sequence via a control loop,
- a sampling rate converter for converting said equalized sequence to an equivalent input sequence to be provided to an error generator at the data rate 1/T,
- an error generator for delivering the data sequence from said input sequence and an error sequence to be used in the control loop.

The invention also relates to a digital system comprising a transmitter for transmitting a digital sequence via a channel and a receiver for extracting said digital sequence from said channel, wherein said receiver is a receiver as described above.

The invention further relates to a an equalizer adaptation method for said receiver. It finally relates to a computer program product for such a receiver and to a signal for carrying said computer program.

The invention applies to a wide variety of asynchronous receivers for use in digital transmission and recording systems. It is particularly advantageous in optical recording systems such as the DVR (digital video recording) system.

BACKGROUND ART

The U.S. Pat. No. 5,999,355 describes an asynchronous receiver such as the one mentioned in the opening paragraph. In accordance with the cited patent, the equalizer is a tapped delay line (Finite Impulse Response filter) with a tap spacing of Ts seconds, and control of the equalizer is based on the classical LMS (Least Mean Square) algorithm. That is to say, updates of the equalizer tap values are produced by correlating the tap sequences with a suitable error sequence. Classical LMS techniques normally apply to synchronous receivers wherein error and tap sequences have the same sampling rate and are phase synchronous. The asynchronous receiver described in the cited patent thus comprises at least two provisions in order that error and tap sequences have the same sampling rate and are phase synchronous. The latter condition implies that any latency in the error sequence should be matched by delaying the tap sequences accordingly. The aforementioned two provisions include an inverse sampling rate conversion (ISRC) for converting the synchronous error sequence at the data rate 1/T into an equivalent error sequence of sampling rate 1/Ts, and delay means to provide delayed versions of the equalizer tap sequences to match the "round-trip" delay arising in the formation of the equivalent error sequence from the equalizer output. This "round-trip" delay is not accurately known a priori because both SRC and inverse SRC introduce a time-varying delay. The matching delay represents the expected or average value of the "round-trip" delay. Discrepancies between the "round-trip" and matching delays tend to cause the adaptation scheme to converge to an erroneous solution. Furthermore, since the matching delay needs not be an integer number of symbol intervals Ts, implementation of the matching delay may require some form of interpolation. This adds to the complexity of the system. The inverse SRC also adds to this complexity so that overall complexity of the adaptation-related circuitry is considerably larger than in synchronous LMS-based adaptation.

SUMMARY OF THE INVENTION

It is an object of the invention to provide an asynchronous receiver using an alternative adaptation topology, based on zero forcing (ZF) techniques, that circumvents the above mentioned disadvantages. The invention permits near-optimum adaptation performance at a very low complexity compared with existing LMS-based schemes.

In accordance with the invention, a receiver as mentioned in the opening paragraph is provided, wherein the control loop comprises:
- control information production means for deriving a synchronous control vector sequence at the data rate 1/T from the error sequence and the data sequence, and
- temporal interpolation means for deriving the control vector sequence from said synchronous control vector sequence.

Using ZF techniques for controlling the adaptation of the equalizer taps avoids, the use of a matching delay and of an ISRC. The resulting scheme is thus essentially as simple as synchronous ZF schemes, and simpler than even synchronous LMS-based schemes. Performance, however, can be comparable to those of LMS-based schemes.

In accordance with a preferred embodiment of the invention, the temporal interpolation means include a bank of latches performing zeroth-order interpolation. The possibility to use latches is based on the recognition that the tap settings produced by the control loop fluctuate only slowly and with small steps. As a result, they can be re-sampled accurately with very simple means. A bank of latches suffices for the conversion from the synchronous to the asynchronous domain.

In accordance with another embodiment of the invention, the control loop further comprises spatial conversion means for converting a given initially T-spaced sequence generated within the control loop into an equivalent Ts-spaced sequence so that the taps of the control vector sequence at the output of the control loop are Ts-spaced. The control signals are produced in the synchronous domain. Therefore, they pertain to control a T-spaced equalizer. Since the equalizer operates at the sampling rate 1/Ts, it actually has a tap spacing of Ts time units. Thus, the invention provides spatial conversion means for converting the T-spaced information into Ts-spaced information.

BRIEF DESCRIPTION OF THE DRAWINGS

The invention and additional features, which may be optionally used to implement the invention, are apparent from and will be elucidated with reference to the drawings described hereinafter and wherein.

DETAILED DESCRIPTION OF THE DRAWINGS

Figure 4:
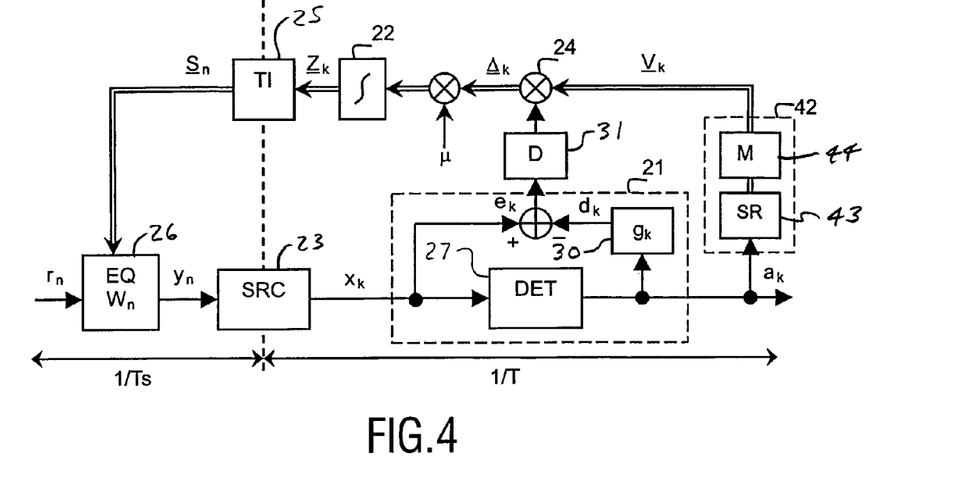
FIG. 4 is a functional block diagram illustrating a receiver topology in accordance with a second embodiment of the invention.
Figure 7:
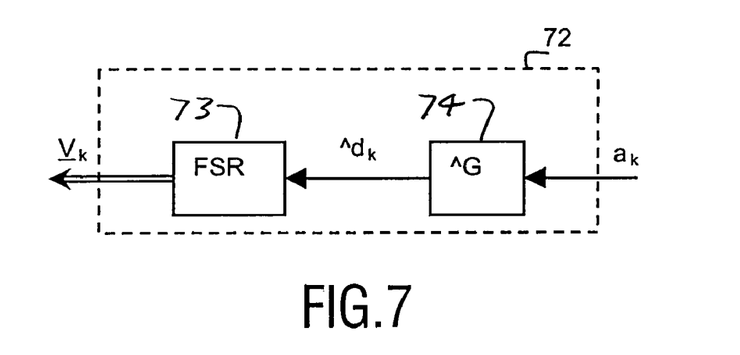
FIG. 7 is a functional block diagram illustrating a receiver topology in accordance with a fifth embodiment of the invention.

The following remarks relate to reference signs. Same functional entities are usually indicated by same block labels in all figures. When reference signs are represented by numbers to indicate functional blocks, the first digit may vary from one functional block to another same functional block in order to distinguish between several embodiments of the functional block. In this case, the first digit usually refers to the figure illustrating the embodiment. As an example, a same functional block performing a spatial conversion function may be referred to as 42 in FIG. 4 and as 72 in FIG. 7 to distinguish between two different embodiments of the spatial conversion function which are illustrated in FIGS. 4 and 7, respectively. In the sequel, we will also adopt the convention that vectors are denoted by underlined symbols, and that the symbols k and n refer to sequences of sampling rate 1/T and 1/Ts, respectively. For example, according to this convention the notation $a_k$ refers to a scalar sequence of sampling rate 1/T, and the notation $\underline{S}_n$ refers to a vector sequence of sampling rate 1/Ts. The length of a vector will be denoted by the symbol N and a subscript indicating the symbol used for the vector. Accordingly, for example, the length of the vector $\underline{S}_n$ is denoted Ns.

Figure 1:
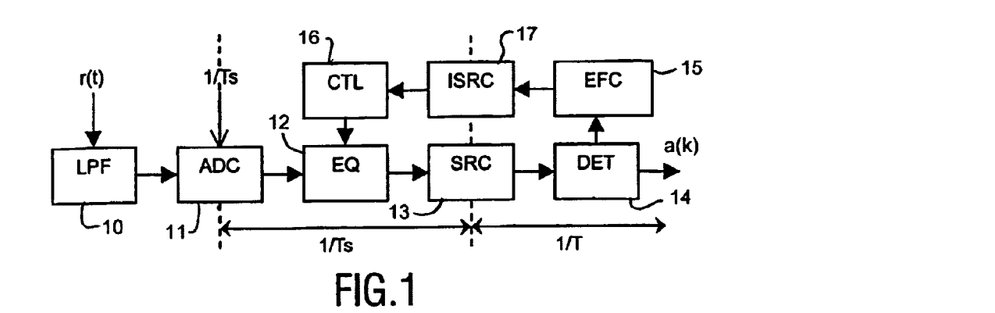
FIG. 1 is a functional block diagram illustrating a generic asynchronous receiver topology for use in digital transmission and recording systems.

FIG. 1 illustrates a generic topology of an asynchronous base-band receiver for digital transmission and recording systems. The receiver generates a data sequence $a_k$ at a data rate 1/T from a received signal r(t). The received signal r(t) is applied to an analog low pass filter LPF 10 whose main function is to suppress out-of-band noise. The LPF output is digitized by an analog-to-digital converter ADC 11 which operates at a crystal-controlled free-running sampling rate 1/Ts, asynchronous to the data rate 1/T, which is high enough to prevent aliasing. The ADC output is applied to an equalizer EQ 12 which serves to condition inter-symbol interference and noise. The equalizer operates at the sampling rate 1/Ts, i.e. asynchronously to the data rate 1/T. A sampling-rate converter SRC 13 produces an equivalent synchronous output which serves as the input of a bit detector DET 14 for delivering the data sequence $a_k$. The SRC forms part of a timing-recovery loop which is not depicted explicitly in FIG. 1. Asynchronous and synchronous clock domains are indicated in FIG. 1 with the symbols 1/Ts and 1/T, respectively.

To cope with variations of the system parameters, the equalizer EQ often needs to be adaptive. To this end, error information is extracted from the bit detector DET by an error formation circuit EFC 15 and is used to control (update) the equalizer taps via a control module CTL 16. Error formation occurs in the synchronous (1/T) clock domain, while control necessarily occurs in the asynchronous (1/Ts) domain. In between, an inverse sampling-rate converter ISRC 17 is required. In practice, the equalizer is often a tapped delay line (Finite Impulse Response filter) with a tap spacing of Ts seconds.

Existing asynchronous adaptation techniques are based on LMS (Least Mean Square) algorithms. With LMS, update information for the equalizer taps is derived by cross-correlating the tap sequences with a suitable error sequence. For this to work, the tap and error signals need to be synchronous both in sampling rate and in phase. The first condition is met via the ISRC. The second one requires that the total latency of SRC, bit-detector, error formation circuit, and ISRC is matched by delaying the tap signals accordingly, prior to cross-correlation. Both ISRC and delay matching add to the complexity of the solution. Delay matching, moreover, may not be accurate because of the time-varying nature of the latency of SRC and ISRC. As a result, adaptation performance may degrade.

Figure 2:
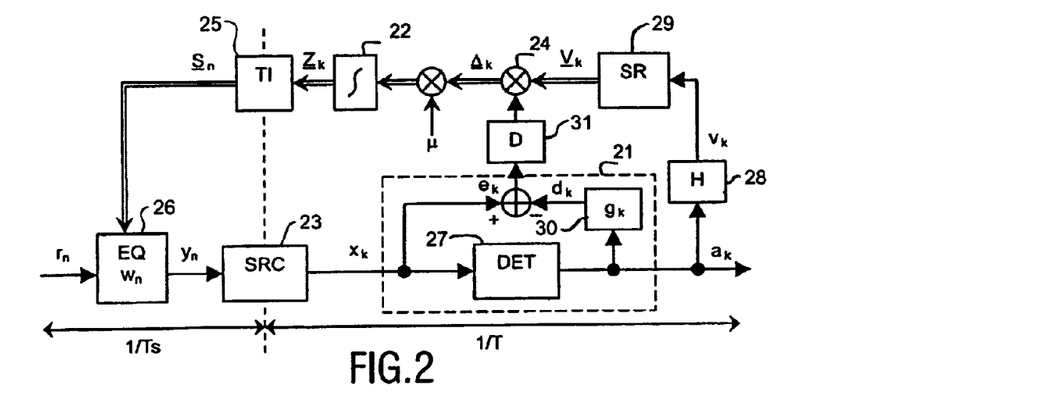
FIG. 2 is a functional block diagram illustrating a receiver topology in accordance with the invention.

FIG. 2 shows a receiver in accordance with the invention comprising an adaptation topology that overcomes the disadvantages mentioned before. Only a part of the data receiver is shown in FIG. 2, namely the part relevant to digital equalizer adaptation. In particular, the timing-recovery subsystem of the receiver, which controls the sampling-rate converter (SRC) 23 and the temporal interpolation means (TI) 25, is not shown. The receiver comprises an adaptive equalizer (EQ) 26, a sampling-rate converter (SRC) and a detector (DET) 27 to produce a data sequence $a_k$ from a received input sequence $r_n$. Adaptation of the equalizer is based on zero-forcing (ZF) techniques as described, for example, in the book by J. W. M. Bergmans "Digital Baseband Transmission and Recording", published by Kluwer Academic Publishers, Boston, 1996, denoted [ref.]. Central to these techniques is that tap update information is derived by cross correlating the aforementioned error sequence $e_k$ of the adaptation (control) loop with a filtered version $v_k=(a*h)k$ of the data sequence $a_k$ or, equivalently, of the bit decisions, where $h_k$ is a suitable impulse response described in [ref.], chapter 8, and the symbol '*' denotes linear convolution. Since the error and data sequences are both synchronous to the data rate 1/T, an ISRC is not needed to derive the update information. Moreover, since both sequences are generated simultaneously, delay matching is almost trivial. Just as in LMS, tap values are derived from the tap update information via a bank of integrators. To close the adaptation loop, a time-base converter is needed to convert the outputs of this bank from the synchronous to the asynchronous clock domain.

In FIG. 2, $r_n$ denotes the sequence obtained by periodic sampling of e.g. an analog replay signal from a recording channel. Sampling is performed at a free-running clock rate 1/Ts which is generally not equal to the data rate 1/T. The sequence $r_n$ is passed through an equalizer EQ having Ts-spaced taps $w_n$ for producing an equalized sequence $y_n$ at its output. Preferably, the equalizer EQ is an FIR (Finite Impulse Response) transversal filter, but it can be any equalizer that contains a linear combiner. The purpose of the equalizer is to shape the response of the (e.g. recording) channel to a prescribed target response and condition the noise spectrum. The equalizer EQ is followed by a sample rate converter SRC which transforms the Ts-spaced equalized sequence $y_n$ into an equivalent T-spaced sequence $x_k$ to be provided at the input of an error generator 21 comprising a bit detector DET. The T-spaced input sequence $x_k$ is ideally synchronous to the data rate 1/T of the channel data sequence $a_k$. Estimates $\hat{a}_k$ of the channel bits $a_k$ are produced by the bit detector. Assuming that the bit detector produces correct decisions, the data sequence and the estimate $\hat{a}_k$ are identical. Occasional bit errors do not significantly affect the performance of the system. Alternatively, at the beginning of transmission, a predetermined data sequence (often referred to as preamble) may precede the actual data in order for initial adaptation to be based on a replica of this predetermined data sequence, which can be synthesized locally in the data receiver without any bit errors. It is common practice to perform the initial stage of adaptation in this so-called 'data-aided' mode of operation, and to switch to the 'decision-directed' mode of operation as depicted in FIG. 2 once adaptation loops have converged. While not depicted explicitly in FIG. 2, it is to be understood that the present description also pertains to this 'data-aided' mode of operation. The remaining part of FIG. 2 illustrates the mechanism of the control loop for adaptively updating the equalizer tap coefficient vector sequence $\underline{w}_n$ using ZF techniques in accordance with the invention. All digital operations involved in the control loop can be realized e.g. by a microprocessor carrying out a suitable computer program. The thick arrows between blocks indicate vector signals transfers while scalar signals are indicated by thin arrows.

Therefore, the control loop comprises:
  control information production means for deriving a synchronous control vector sequence $\underline{Z}_k$ at the data rate 1/T, from the error sequence $e_k$ and the data sequence $a_k$, and
  temporal interpolation means TI for deriving the control vector sequence $\underline{S}_n$ from said synchronous control vector sequence $\underline{Z}_k$.

In FIG. 2, the control vector sequence $\underline{S}_n$ directly controls the equalizer, i.e. the equalizer tap vector sequence $\underline{S}_n$ simply coincides with $\underline{S}_n$.

The synchronous control vector sequence $\underline{Z}_k$ produced by the control information production means is formed by a bank of Nz integrators 22, whose input is derived from a cross product 24 $e_k \underline{V}_k$ where $\underline{V}_k$ is a reference vector sequence consisting of Nv reference sequences. This reference vector sequence is obtained by applying the data sequence $a_k$ to a filter H 28 whose impulse response $h_k$ is a design freedom that can be used to optimize adaptation properties (see [ref.], chapter 8), to form a reference sequence vk, prior to a serial to parallel conversion performed by a shift register SR 29 to form the vector sequence $\underline{V}_k$ out of the reference sequence vk. The ZF equalizer adaptation scheme is detailed hereafter.

The variables at the output of the integrators 22, denoted $z_k^j$, obey the following equation:

$$z_{k+1}^j = z_k^j + \mu \Delta_k^j, j = 0, \ldots, N_z - 1 \quad (1)$$

where:
  $z_k^j$ is the output of the j-th integrator at instant k,
  $\mu$ is a small scaling factor (often referred to as step size) which determines closed-loop time constants,
  $\Delta_k^j$ is a tap-error estimate at iteration k, and
  $N_z$ is the number of integrators.

According to the ZF scheme, the estimate $\Delta_k^j$ is given by:

$$\Delta_k^j = e_{k-D} v_{k-j} = e_{k-D}(\hat{a}*h)_{k-j} \quad (2)$$

where
  $e_k$ is the error between the SRC output and a (delayed version of) the desired detector input $d_k = (a*g)_k$, where $g_k$ 30 is the target response (of a filter G) for the equalizer adaptation
  $v_k$ is a filtered version of the (estimates of the) data sequence $a_k$,
  $h_k$ is a suitable impulse response (cf. [ref], chapter 8),
  D 31 is an appropriate delay depending on other delays in the system. The purpose of this delay is to align the error signal $e_k$ and the sequence $v_k$ in time.

As explained in more detail in [ref], chapter 8, in some cases D can be negative. In such cases a (positive) delay −D may be applied to the reference sequence vk instead of a (negative and hence unphysical) delay D to ek. For the sake of completeness it is mentioned that equation (2) and FIG. 2 describe only one of the various possible manners to derive tap-error estimates $\Delta_k^j$ from the error sequence $e_k$ and the data sequence $a_k$. For example, either of the two sequences $e_k$ and $(\hat{a}*h)_{k-j}$ can be strongly quantized so as to simplify implementation, and the multiplication in (2) can be replaced by a selective-update mechanism.

FIG. 2 shows that the synchronous control vector sequence $\underline{Z}_k$ at the output of the integrators is updated every T seconds (synchronous domain), while the equalizer coefficient vector $\underline{W}_n$ needs to be updated every Ts seconds, since the equalizer operates in the asynchronous domain. The necessary time-base conversion is performed through the temporal interpolation means TI for deriving an asynchronous control vector sequence $\underline{S}_n$ at the sampling rate 1/Ts from the synchronous control vector sequence $\underline{Z}_k$ at the output of the bank of integrators. Since tap values change only slowly with respect to both sampling rates, the temporal interpolation can be done in the simplest conceivable manner, e.g. via a bank of latches performing zeroth-order interpolation. As a result, asynchronous zero-forcing equalization is essentially as simple as its synchronous counterpart. This is unlike LMS, which in its synchronous form is already more complex than ZF, and where the asynchronism adds a significant further overhead. In spite of its simplicity, performance of the ZF loop is close to that of its LMS counterpart if designed properly. There is an additional issue. The equalizer has a tap spacing of Ts seconds, i.e. it acts to delay the input sequence in steps of Ts seconds to obtain the successive tap signals, which are then combined linearly with weights $w_n^j$, j=1, . . . , Nw, that are defined by the coefficient vector sequence $\underline{W}_n$. The control vector sequence $\underline{s}_n$ at the output of the bank of integrators, however, pertains to a T-spaced equalizer, i.e. successive components $s^j$, j=1, . . . , Ns of $\underline{s}_n$ are meant in principle as weighting factors for an equalizer with tap spacing T. The discrepancy between this nominal tap spacing of T seconds and the actual tap spacing of Ts seconds results in a degradation of adaptation performance, both in terms of the steady-state solution at which the equalizer settles and in terms of a degradation of loop efficiency. As a result, the topology of FIG. 2 is mainly suitable for near-synchronous applications, e.g. applications in which 1/Ts and 1/T are close to each other, and preferably differ less than some 20–40%. This condition is met in many practical systems, e.g. in most channel ICs (Integrated Circuits) for hard disk drivers.

Figure 3:
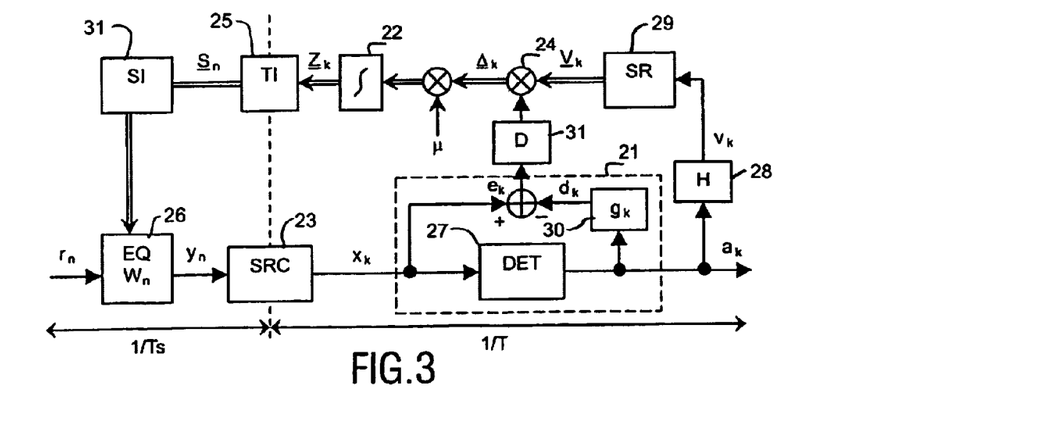
FIG. 3 is a functional block diagram illustrating a receiver topology in accordance with a first embodiment of the invention.

In order to be able to use the invention within a larger range of applications, an improvement of the scheme described in FIG. 2 is proposed. According to this improvement, the control loop further comprises spatial conversion means for deriving the equalizer coefficient vector sequence $\underline{W}_n$ from the asynchronous control vector sequence $\underline{S}_n$ at the output of the temporal interpolation means. This results in converting an initially T-spaced sequence generated within the control loop into an equivalent Ts-spaced sequence for controlling the equalizer coefficient vector $\underline{W}_n$. In FIG. 3, these spatial conversion means are indicated with the symbol SI 31. Since the update variables $s_n^j$ describe the coefficients of a T-spaced equalizer, it is indeed necessary to convert this T-spaced information into Ts-spaced information. This necessitates interpolation on the coefficients $s^j$, which is performed by the Spatial Interpolator block SI. Conceptually, the update variables $S_j$ are T-spaced samples of an underlying time-continuous equalizer filter whose impulse response is denoted w(t), i.e. $s^j$=w(jT), j=1, . . . , Ns. Assuming that w(t) were available, we would have to resample it at positions $t_i$=i×Ts, for i=0, . . . , $N_w$-1, in order to generate the necessary equalizer coefficients $w^i$=w(i×Ts). The variable t here does not indicate time but position, and assumes continuous values from a certain interval (the span of the filter). In the same sense, i is a position index that is independent of time, i.e., $t_i$ is fully determined by i and does not change over time. However, since only T-spaced samples of w(t), namely $s^j$, are available, interpolation of these samples must be used to produce the Ts-spaced variables $w^i$.

One of the simplest forms of interpolation is linear interpolation, which is attractive from a computational point of view, but other forms of interpolation can be considered such as e.g. nearest-neighbor interpolation, which is even simpler. The re-sampling positions $t_i$=i×$T_s$ can be equivalently written as $t_i$=($m_i$+$c_i$)T, where $0 \leq c_i < 1$, and $$m_i = \left\lfloor i\frac{T_s}{T} \right\rfloor, c_i = i\frac{T_s}{T} - m_i. \quad (3)$$

As $c_i$ varies between 0 and 1, $t_i$ varies between $m_i$T and ($m_i$+1)T, and w(t) varies between w($m_i$T)=$s^{m_i}$ and w(($m_i$+1)T)=$s^{m_i+1}$. According to one method of linear interpolation, the value of w(t) at position $t_i$ is then calculated as:

$$w^i = w(t_i) = (1-c_i) \times s^{m_i} + c_i \times s^{m_i+1} \quad (4)$$

With the aid of (4), the spatial interpolator SI of FIG. 3 converts the T-spaced taps $s^j$ at the output of the latch to Ts-spaced tap settings $w^i$ representing the equalizer taps. In order to perform this conversion it is necessary to know, or estimate, the ratio Ts/T of the channel bit rate to the sampling rate as indicated in equation (3). However, an estimate of this ratio is already available within the sampling rate converter SRC of FIG. 3. The SRC re-samples the Ts-spaced sequence $y_n$ at instants $t_k$=kT, which can be re-written as $t_k$=($m_k$+$\mu_k$)Ts. In the presence of phase errors, the difference between successive sampling instants varies from the nominal value of T according to $t_k - t_{k-m_1} = T + \tau_k T$, where $\tau_k$ is a phase error in the reconstructed T-spaced clock. Then we arrive at the following equation:

$$(m_k - m_{k-1}) + (\mu_k - \mu_{k-1}) = \frac{T}{T_s} + \tau_k \frac{T}{T_s} \quad (5)$$

The timing-recovery loop that controls the SRC acts to force the average of the phase error to zero. Therefore, the average of the quantity on the left hand side of (5) will settle on the actual value of T/Ts, or the inverse of the ratio that is needed for linear interpolation.

The conversion scheme of (4) is relatively simple, however it might not be optimal from an implementation standpoint. One reason is that it involves rather complicated multiplications of multi-bit numbers. This could be relaxed up to a certain point by quantizing the interpolation filter coefficient $c_i$ to a small number of bits, but simpler schemes are possible. These schemes arise by performing the spatial conversion before the latch and integrators, essentially "folding it back" into the ZF update algorithm. This results in the generic topology of FIG. 4.

In the topology of FIG. 4, spatial conversion is performed through fractional delay means 42 which derive a Ts-spaced reference vector sequence $\underline{V}_k$ from the data sequence $a_k$ by applying delays in steps of Ts time units to a filtered version of the data sequence $a_k$. The synchronous control vector sequence $\underline{Z}_k$ which s derived from the error sequence $e_k$ and the reference vector sequence $\underline{V}_k$, has Nz coefficients $z^j$ (j=0, . . . , $N_z$-1), which now have a spacing of $T_s$ seconds, versus T seconds in FIG. 3. This is because, in the topology of FIG. 4 spatial conversion is performed in the synchronous time-domain by the fractional delay means 42. The fractional delay means 42 may include, a linear matrix M 43, which performs the spatial interpolation and digital filtering operations by transforming bit decisions $\hat{a}_k$ into appropriate variables for forming the asynchronous equalizer tap updates. The matrix M operates on the output of a shift register SR 44, which performs serial to parallel conversion on the bit estimates $\hat{a}_k$ This topology is highly generic in that it can cover arbitrary target responses and any form of interpolation.

In the sequel it will be shown how to perform the spatial conversion of (4) at an early stage in the receiver topology of FIG. 4, without hampering the performance of the receiver. At iteration k+1, with iterations performed at rate 1/T, that is before the temporal interpolation operation, we get from (4):

$$w_{k+1}^i = (1-c_i) \times z_{k+1}^{m_i} + c_i \times z_{k+1}^{m_i+1}, i=0, \ldots, N_w-1 \quad (6)$$

Using (1), (6) becomes:

$$w_{k+1}^i = (1-c_i) \times (z_k^{m_i} + \mu \Delta_k^{m_i}) + c_i \times (z_k^{m_i+1} + \mu \Delta_k^{m_{30}\ 1}) = w_k^i + \mu \times ((1-c_i) \times \Delta_k^{m_i} + c_i \times \Delta_k^{m_i+1}) \quad (7)$$

The operations involved in (7) are still not simpler than the ones in (4). However, (7) can be further manipulated in order to decrease complexity. Towards that end use is made of (2). In order to keep expressions short, D is set to zero in the following. Using the expression for $\Delta_k^j$ in (7), we arrive at:

$$w_{k+1}^i = w_k^i + \mu \times e_k \times ((1-c_i) \times v_{k-m_i} + c_i \times v_{k-m_i-1}) \quad (9)$$

A simplification that is commonly made in order to ease the computation of $\Delta_k^j$ is to replace $v_k$ by sgn ($v_k$), where the operator sgn(x) stands for the operation of extracting the sign of variable x In many applications, notably in optical recording receivers, the impulse response $h_k$ is commonly chosen so that sgn $(v_k)$=sgn($\hat{a}$*h)$_k$=$a_k$. It is implicitly assumed that the detector makes no decision errors, so $\hat{a}_k$=$a_k$. Occasional bit errors do not significantly affect the results that follow and the performance of the system in general Replacing vk by sgn($v_k$)=$a_k$ in (8), we get the simplified update:

$$w_{k+1}^i = w_k^i + \mu \times e_k \times ((1-c_i) \times a_{k-m_i} + c_i \times a_{k-m_i-1}) = w_k^i + \mu \times e_k \times \alpha \quad (9)$$

The quantity:

$$\alpha_i = (1-c_i) \times a_{k-m_i} + c_i \times a_{k-m_i-1}$$

in ( 9) can be computed based on simple logic without the need of multiplications, since $a_k \in \{-1,1\}$. This becomes apparent by re-writing $\alpha_i$ as:

$$\alpha_i = a_{k-m_i} + c_i \times (a_{k-m_i-1} - a_{k-m_i}) = \quad (10)$$

-continued $$\left\{ \begin{array}{l} a_{k-m_i}, \text{if: } a_{k-m_i-1} = a_{k-m_i} \\ (1-2c_i) \times a_{k-m_i}, \text{if: } a_{k-m_i-1} \neq a_{k-m_i} \end{array} \right\}$$

Moreover, since $N_w$ is fixed, if the ratio Ts/T stays almost constant throughout the adaptation, which is the case in CLV (Constant Linear Velocity) mode, or in CAV (Constant Angular Velocity) mode if the sampling rate is adjusted accordingly, then the values $m_i$ and $c_i$ can be tabulated for each index i. Then the values of the quaternary variable $\alpha_i$ can also be tabulated.

Figure 5:
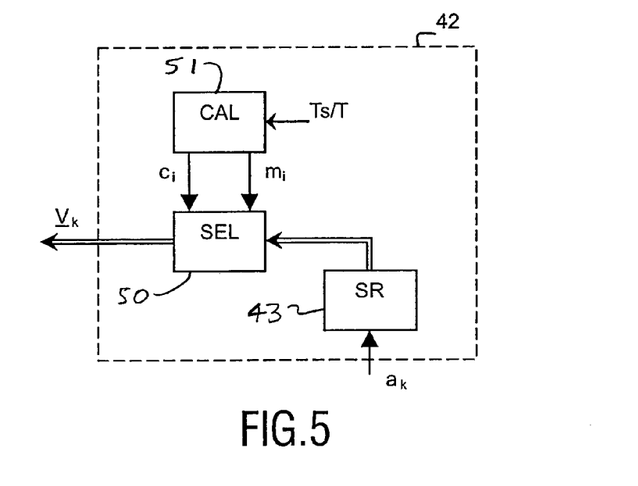
FIG. 5 is a functional block diagram illustrating a receiver topology in accordance with a third embodiment of the invention.
Figure 6:
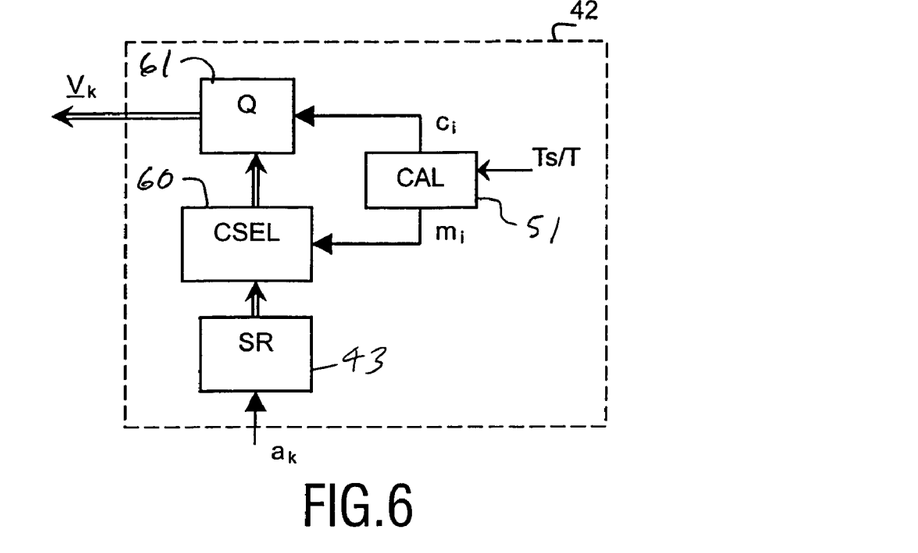
FIG. 6 is a functional block diagram illustrating a receiver topology in accordance with a forth embodiment of the invention.

FIG. 5 and FIG. 6 illustrate two different embodiments of the fractional delay, means 42 in the generic topology of FIG. 4 The two embodiments pertain to two distinct cases, namely the under-sampling case corresponding to Ts>T and the over-sampling case of Ts<T, respectively. The implications of the scheme of (9) are considered in each scenario.

FIG. 5 pertains to the under-sampling case which is the case of higher practical interest, since the sampling device, the equalizer and the SRC operate at the rate 1/Ts which is lower than the channel bit rate 1/T. For recording systems comprising rotating discs this can be especially advantageous at higher rotating speeds. Let us take the DVR system as an example. Since the cut-off frequency of the DVR channel is around ⅓T, essentially information loseless sampling is possible down to the Nyquist rate of ⅔T. Possible simplifications of the linear interpolation scheme of (9) are considered for computational complexity reasons. This is possible by replacing $\alpha_i$ with $sgn(\alpha_i)$ in (9). From (9), this sign is determined by $c_i$ according to:

$$sgn(\alpha_i) = \left\{ \begin{array}{l} a_{k-m_i}, \text{if: } 0 \leq c_i < 0,5 \\ a_{k-m_i-1}, \text{if: } 0,5 < c_i \leq 1 \end{array} \right\} \quad (11)$$

This effectively leads to a nearest sample algorithm, also called nearest-neighbor interpolation, for which the coefficient update in (9) reduces to a correlation of the error $e_k$ with the information bit $a_{k-J_i}$ where $J_i$ is selected for $J_i T$ to be as close as possible to $t_i=iTs$, i.e., $$J_i = \underset{k}{\operatorname{argmin}}|kT - iTs| \quad (12)$$

Ambiguity arises in (11) whenever $c_i \approx 0.5$ and $a_{k-mi} \neq a_{k-mi-1}$. In that case iTs lies in the middle of $m_i T$ and $(m_i+1)T$, and selection of one over the other will result in a sign reversal in the ZF coefficient update. This suggests that $sgn(a_i)$ conveys essentially no control information in that case. To avoid the resulting gradient noise, for $c_i \approx 0.5$ the coefficient update should be conditioned on the absence of a transition, i.e., a ternary quantity should effectively be used:

$$sgn(\alpha_i) = \left\{ \begin{array}{l} 0, \text{if: } a_{k-m_i} \neq a_{k-m_i-1} \\ a_{k-m_i}, \text{if: } a_{k-m_i} = a_{k-m_i-1} \end{array} \right\} \quad (13)$$

The resulting algorithm for the update of the equalizer coefficients is as simple as its, synchronous ZF counterpart.

The resulting topology is illustrated in FIG. 5. It is a special case of FIG. 4 in that the linear matrix M reduces to a selector SEL 50 performing the operations of (11) and (13). The selector is controlled by the variables $m_i$ and $c_i$, for $i=0, \ldots, N_w-1$, provided by a calculator CAL 51 which is in turn provided with the value of T/Ts obtained via the SRC. The calculator performs the operations described in (3).

In the under-sampling case, referring back to the topology of FIG. 3, $s_n$, with a tap-spacing of T seconds, has more coefficients than $w_n$, which has a tap-spacing of $T_s$ seconds. Accordingly, the number of integrators 22 that are used is larger than $N_w$, the number of equalizer taps. By performing the spatial conversion before the integration stage, as illustrated in FIG. 4, the variables at the integrator input become Ts-spaced, and the number of integrators reduces to $N_w$, with associated savings in hardware.

FIG. 6 pertains to the over-sampling case which is of less practical value, especially for optical recording channels whose spectrum is band-limited below the Nyquist frequency. In certain cases however, it is necessary to over-sample the replay signal, for example in order to cope with variations of the channel bit rate during disc read-out in optical recording systems (in CAV mode). When the playback signal is over-sampled, Or $T_s<T$, spatial conversion of a T-spaced control vector sequence requires interpolation.

In applications such as digital recording, linear interpolation tends to perform well. However, simpler forms of interpolation, such as nearest-neighbor interpolation, are not guaranteed to work well, especially at high over-sampling rates. The preferred implementation of the fractional delay means 42 in the over-sampling case is illustrated in FIG. 6. It is actually an implementation of the linear interpolation expressed by (10). The purpose of the coefficient selector CSEL 60 is to select the desired interpolants $a_{k-mi}$ and $a_{k-m-il}$ from the detector output sequence, given the variables $m_i$ calculated by the calculator CAL through the use of (3). Subsequently, all interpolants, for all $i=0, \ldots N_w-1$, are collected in a vector, which is then multiplied with a matrix Q 61 to generate the variables $\alpha_i$ in (10). Matrix Q has $N_w$ rows and L columns, where L is the length of the vector of interpolants. Each row of Q, denoted $Q_i$, has exactly two non-zero elements:

$$Q_i = [0^{n_i}, 1-c_i, c_i, 0^{L-2-n_i}] \quad (14)$$

where $n_i=0, \ldots L-2$. The matrix multiplication in FIG. 6 is only conceptual, since computation of the $\alpha_i$'s can be done without any multiplications, as (10) indicates. The resulting algorithm for ZF asynchronous equalizer update in the over-sampling case is then almost as simple as its under-sampling counterpart.

In accordance with another particular embodiment of the invention, illustrated in FIG. 7, the fractional delay means 72 include:

a discrete-time filter $\hat{G}$ 73 for filtering the data sequence $a_k$ so that the filter output $\overline{d}_k$ resembles the target filter output $d_k$ and a fractional shift register (FSR) 74 for applying delays in steps of Ts time units to the discrete-time filter output $\overline{d}_k$.

In accordance with this embodiment, the reference vector sequence $\underline{V}_k$ is produced in two steps, as depicted in FIG. 7. The first step carries out a discrete-time filtering operation in which $a_k$ is applied to the filter $\hat{G}$ whose impulse response $\hat{g}_k$ resembles the target response $g_k$ (or, alternatively, resembles the sampled impulse response of the channel). The output of this filter is denoted $\bar{d}_k$ since it resembles the desired detector input $d_k$. Out of the many possibilities, two choices of $\hat{g}_k$ are of interest:

(c) $\hat{g}_k$=gk, whence $\bar{d}_k$=$d_k$, and
(d) $\hat{g}_k$=δk, whence $\bar{d}_k$=$a_k$ In both cases $\bar{d}_k$ is already available within the topology of FIG. 4, so that no added hardware is needed for its computation. The second step in the topology of FIG. 7, carried out by the block labeled FSR, applies delays in steps of Ts seconds to $\bar{d}_k$ in order to obtain an approximate version $\underline{V}_k$ of the reference vector sequence. Synthesis of fractional delays requires interpolation. Since $\hat{g}_k$ tends to have limited bandwidth, simple forms of interpolation, such as nearest-neighbor (0th-order) and linear interpolation tend to perform well. Higher-order interpolation is normally not necessary.

Figure 8:
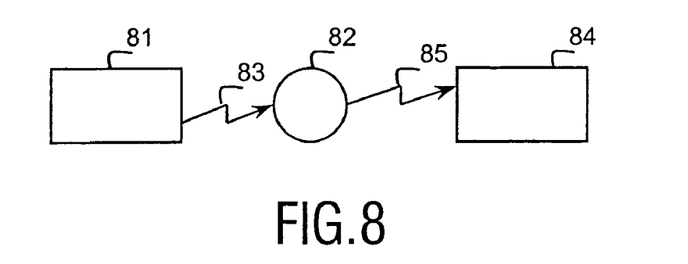
FIG. 8 is a schematic block diagram illustrating a digital system in accordance with the invention.

FIG. 8 shows an example of a system in accordance with the invention comprising a receiver as shown in one of the FIGS. 1 to 7. The system can be, for example, a digital recording system. It comprises a recorder 81 for recording a digital sequence 83 on a recording support 82 and a receiver 84 for reading the recorded sequence 85 from said recording support. The recording support 82 may be, for example, an optical disk.

The drawings and their description herein before illustrate rather than limit the invention. It will be evident that there are numerous alternatives which fall within the scope of the appended claims. In this respect, the following closing remarks are made.

There are numerous ways of implementing functions by means of items of hardware or software, or both. In this respect, the drawings are very diagrammatic, each representing only one possible embodiment of the invention. Thus, although a drawing shows different functions as different blocks, this by no means excludes that a single item of hardware or software carries out several functions. Nor does it exclude that a function is carried out by an assembly of items of hardware or software, or both.

The invention claimed is:

1. A receiver for delivering a data sequence ($a_k$) at a data rate 1/T from a received sequence ($r_n$) sampled at a clock rate 1/Ts, asynchronous to the data rate 1/T, the receiver comprising:
   an adaptive equalizer (EQ) for delivering an equalized sequence ($y_n$) from said received sequence ($r_n$), said equalizer operating at the clock rate 1/Ts and having an equalizer coefficient vector ($\underline{W}_n$) controlled by a control vector sequence ($\underline{s}_n$) via a control loop,
   a sampling rate converter (SRC) for converting said equalized sequence ($y_n$) to an equivalent input sequence ($x_k$) to be provided to an error generator (21) at the data rate 1/T,
   an error generator (21) for delivering the data sequence ($a_k$) from said input sequence ($x_k$) and an error sequence ($e_k$) to be used in the control loop,
wherein said control loop comprises:
   control information production means (22, 42, 72, 21) for deriving a synchronous control vector sequence ($\underline{Z}_k$) at the data rate 1/T from the error sequence ($e_k$) and the data sequence ($a_k$), and
   temporal interpolation means (TI) for deriving the control vector sequence ($\underline{S}_n$) from said synchronous control vector sequence ($\underline{Z}_k$).

2. A receiver as claimed in claim 1, wherein said temporal interpolation means (TI) include zeroth-order interpolation means.

3. A receiver as claimed in claim 2, wherein said zeroth-order interpolation means comprise at least a latch.

4. A receiver as claimed in claim 1, wherein the control loop further comprises spatial conversion means (SI;42;72) for converting a given initially T-spaced sequence generated within the control loop into an equivalent Ts-spaced sequence for controlling said equalizer coefficient vector ($\underline{W}_n$).

5. A receiver as claimed in claim 4, wherein said spatial conversion means (SI;42;72) are arranged to perform a linear interpolation.

6. A receiver as claimed in claim 4, wherein said spatial conversion means (SI;42;72) are arranged to perform a nearest-neighbor interpolation.

7. A receiver as claimed in claim 4, wherein said spatial conversion means include spatial interpolation means (SI) for deriving the equalizer coefficient vector ($\underline{W}_n$) from the control vector sequence ($\underline{S}_n$) at the output of the temporal interpolation means (TI).

8. A receiver as claimed in claim 4, wherein said spatial conversion means (SC) include fractional delay means (42; 72) for deriving a Ts-spaced reference vector sequence ($\underline{V}_k$) from the data sequence ($a_k$) by applying delays in steps of Ts time units to a filtered version of the data sequence ($a_k$), and wherein said synchronous control vector sequence ($\underline{Z}_k$) is derived from the error sequence ($e_k$) and said reference vector sequence ($\underline{V}_k$).

9. A receiver as claimed in claim 8, wherein the error generator (21) comprises:
   a bit detector (DET) having a target response, for receiving the input sequence ($x_k$) and for delivering the data sequence ($a_k$),
   a target filter (G) for receiving said data sequence ($ak$) and delivering a target filter output ($d_k$), said target filter having an impulse response ($g_k$) which demarcates said target response and
   comparison means (+) for comparing said target filter output ($d_k$) to said input sequence ($x_k$) to obtain the error sequence ($e_k$), said fractional delay means (72) comprising:
   a discrete-time filter ($\hat{}$G) for filtering the data sequence ($a_k$) so that the filtered version of said data sequence ($\hat{}d_k$) resembles said target filter output ($d_k$) and
   a fractional shift register (FSR) for applying delays in steps of Ts time units to said filtered version of said data sequence ($\hat{}d_k$).

10. A receiver as claimed in claim 1, for use in a digital recording system.

11. A digital system comprising a transmitter for transmitting a digital sequence via a channel support and a receiver for extracting said digital sequence from said channel support, wherein said receiver is a receiver as claimed in claim 1.

12. In a receiver comprising an adaptive equalizer, an equalizer adaptation method of receiving a sequence ($r_n$), sampled at a clock rate 1/Ts, and of delivering a data sequence ($a_k$) at a data rate 1/T, the method comprising the following steps:
   an adaptive equalizing step of delivering an equalized sequence ($y_n$) from the received sequence ($r_n$) using an equalizer coefficient vector ($\underline{W}_n$),
   a sampling rate converting step (SRC) of converting said equalized sequence ($y_n$) to an equivalent input sequence ($x_k$) to be processed through an error generating step (21) at the data rate 1/T, an error generating step (21) of generating an error sequence ($e_k$) and the data sequence ($a_k$) at the data rate 1/T from said input sequence ($x_k$), a control step of generating a control vector sequence ($\underline{S}_n$) from the error sequence ($e_k$) and the data sequence ($a_k$), for controlling said equalizer coefficient vector ($\underline{W}_n$), wherein said control step comprises:

a control information production step for deriving a synchronous control vector sequence ($\underline{Z}_k$) at the data rate 1/T from the error sequence ($e_k$) and the data sequence ($a_k$), and a temporal interpolation step (TI) for deriving the control vector sequence ($\underline{S}_n$) from said synchronous control vector sequence ($\underline{Z}_k$).

13. A computer program product for a receiver computing a set of instructions which when loaded into the receiver, causes the receiver to carry out the method as claimed in claim 12.

14. A signal for carrying a computer program, the computer program being arranged to carry out the method as claimed in claim 12.

15. A system as claimed in claim 11, wherein said temporal interpolation means (TI) include zeroth-order interpolation means.

16. A system as claimed in claim 15, wherein said zeroth-order interpolation means comprise at least a latch.

17. A system as claimed in claim 11, wherein the control loop further comprises spatial conversion means (SI;42;72) for converting a given initially T-spaced sequence generated within the control loop into an equivalent Ts-spaced sequence for controlling said equalizer coefficient vector ($\underline{W}_n$).

18. A system as claimed in claim 17, wherein said spatial conversion means (SI;42;72) are arranged to perform a linear interpolation.

19. A system as claimed in claim 17, wherein said spatial conversion means (SI;42;72) are arranged to perform a nearest-neighbor interpolation.

* * * * *